(12) United States Patent
Wu

(10) Patent No.: US 10,740,014 B2
(45) Date of Patent: Aug. 11, 2020

(54) MEMORY SIZE DETERMINING METHOD

(71) Applicant: JMicron Technology Corp., Hsin-Chu (TW)

(72) Inventor: Cheng-Huan Wu, New Taipei (TW)

(73) Assignee: JMicron Technology Corp., Hsin-Chu (TW)

( * ) Notice: Subject to any disclaimer, the term of this patent is extended or adjusted under 35 U.S.C. 154(b) by 0 days.

(21) Appl. No.: 16/276,546

(22) Filed: Feb. 14, 2019

(65) Prior Publication Data

US 2020/0167077 A1    May 28, 2020

(30) Foreign Application Priority Data

Nov. 28, 2018   (TW) .............................. 107142347 A

(51) Int. Cl.
*G06F 12/00*   (2006.01)
*G06F 3/06*   (2006.01)
*G06F 9/54*   (2006.01)

(52) U.S. Cl.
CPC ............ *G06F 3/064* (2013.01); *G06F 3/0607* (2013.01); *G06F 3/0679* (2013.01); *G06F 9/544* (2013.01)

(58) Field of Classification Search
CPC ...... G06F 3/064; G06F 3/0607; G06F 3/0679; G06F 9/544; G06F 12/0238; G06F 12/0246
See application file for complete search history.

(56) References Cited

U.S. PATENT DOCUMENTS

| 8,375,173 | B2 | 2/2013 | Wang | |
| 2008/0133583 | A1* | 6/2008 | Artan | .................... G06F 21/564 |
| 2008/0168320 | A1 | 7/2008 | Cassuto | |
| 2008/0288715 | A1 | 11/2008 | Maddali | |
| 2014/0379991 | A1 | 12/2014 | Lomet | |

* cited by examiner

*Primary Examiner* — Shawn X Gu
(74) *Attorney, Agent, or Firm* — Winston Hsu

(57) ABSTRACT

The present invention provides a memory size determining method which includes: writing a magic string into an initial location of the memory space of a memory; performing a first time reading with a first range on the memory, and if the magic string is not found in the first time reading, performing a second time reading with a second range on the memory, until the magic string is found; and if the magic string is found in the N-th time reading, determining the N-th range corresponding to the N-th time reading as the memory size, wherein N is an positive integer larger than or equal to 1.

6 Claims, 2 Drawing Sheets

MEMORY SIZE DETERMINING METHOD

BACKGROUND OF THE INVENTION

1. Field of the Invention

The present invention relates the field of memory devices, and more particularly, to a memory block size determining method.

2. Description of the Prior Art

Serial peripheral interface (SPI) is a communications interface for providing simple connection between two devices, and is used as an interface for the communications between a host device and one or more slave devices. The SPI may be used to transmit and receive data, and is functioned as a full duplexed protocol.

There are a plenty of types of SPI flash memories available on the market, but the size of each flash memory could be different from one another, when the size of the burned-in data is larger than that of the flash memory, some undesired or unexpected errors might occur. Hence, how to properly prevent from burning large-sized data into the SPI flash memory is an issue to be solved in this field.

A related art method proposes recording the corresponding RDID and memory size of each flash memory in a datasheet (such as a look-up table (LUT)), so that the RDID and memory size of the flash memory to be read can be obtained from looking-up the datasheet. In other words, the related art method must repeatedly checking the datasheet, which can be very time consuming and increase the difficulty of maintenance. For example, every time a new flash memory is adopted, the developer must study its specification and the correspondingly modify the program code and the datasheet.

SUMMARY OF THE INVENTION

An objective of the present invention is to provide a memory block size determining method to obtain the memory size for various usages, in order to solve the problem encountered in related art techniques. The present invention is able to solve the aforementioned problem without the need of prerecording information of the memory (such as the specification thereof) in a datasheet (or LUT) for follow-up operations.

At least one embodiment of the present invention provides a memory block size determining method which comprises the following steps: writing a magic string into an initial location of the memory space of a memory; performing a first reading with a first range on the memory, and if the magic string is not found in the first reading, performing a second reading with a second range on the memory, until the magic string is found; and if the magic string is found in the N-th reading, determining the N-th range corresponding to the N-th reading as the block size of the memory, wherein N is an positive integer larger than or equal to 1.

By utilizing the above method of the present invention, the block size of the memory can be quickly and correctly obtained. Further, the implementation of the embodiment of the present invention does not need to change the current hardware structure nor add additional elements, and therefore the overall cost will not increase significantly. Compared with related art techniques, the present invention may improve the reading of memory devices without introducing a side effect, or in a way that less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Some phrases in the present specification and claims refer to specific elements; however, please note that the manufacturer might use different terms to refer to the same elements. Further, in the present specification and claims, the term "comprise" is open type and should not be viewed as the term "consist of."

Figure 1:
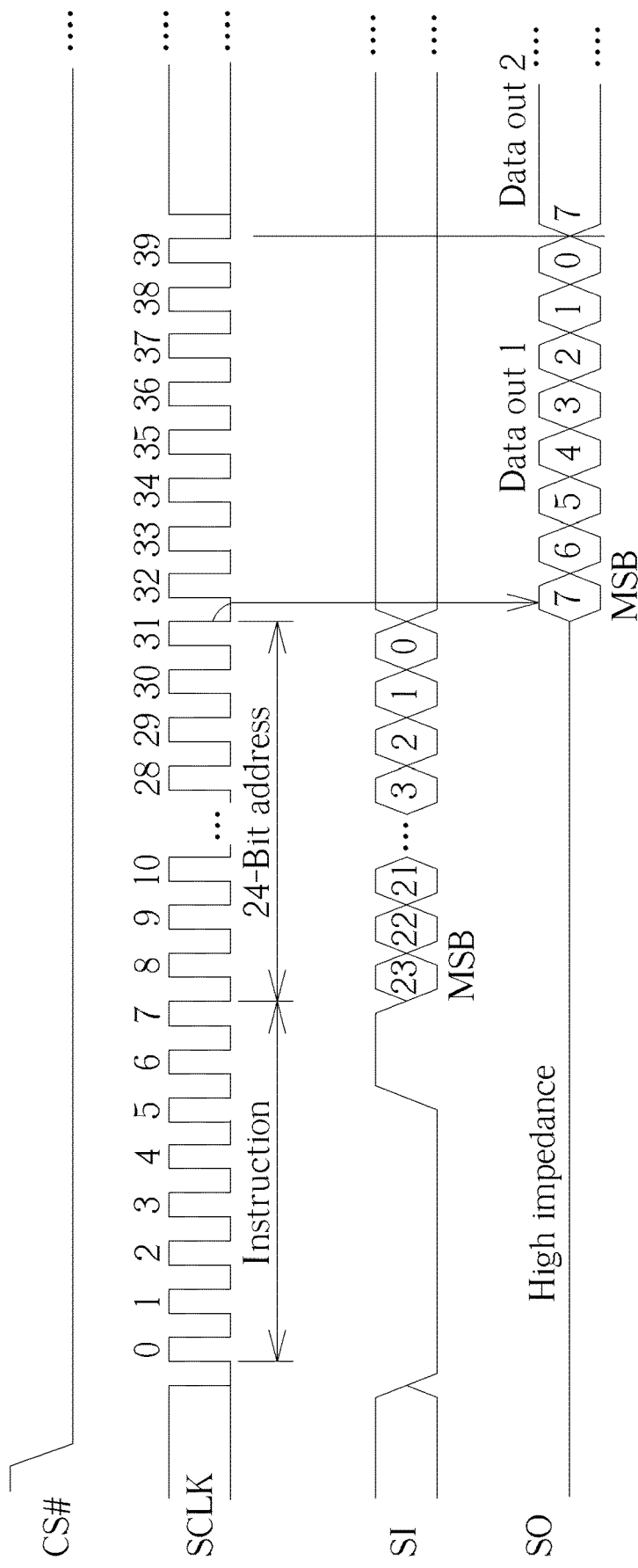
FIG. 1 is a diagram illustrating operations of an SPI flash memory.

Please refer to FIG. 1, which is a diagram illustrating operations of an SPI flash memory. As shown in FIG. 1, there are two control lines and data lines in total. Said two control lines comprise a serial clock line SCLK and a chip selection line CS #, wherein the serial clock line SCLK is arranged to provide digital clock signal, the chip selection line CS # is arranged to select a device to be operated. Said two data lines comprise a signal output line SO and a signal input line SI for data transmissions.

In this example, 24 bit reading commands are used to read the content of the SPI flash memory, and the reading command is transmitted via the signal input line SI. After that, three bits ($A_{23}$-$A_0$) located at the first memory location will need to be read. In this example, only the most significant bit ($A_{MSB}$) to the bit $A_0$ are decoded, and the rest of the bits ($A_{23}$-$A_{MSB}$) are skipped.

Other than the related art method that constantly records the RDID and memory size of each flash memory and then confirms the RDID and memory size by looking up table (in other words, the details of a new flash memory have to be recorded in the datasheet beforehand so that the information of the new flash memory is "known"), the present invention adopts a real-time detection/calculation approach to detect/calculate the corresponding memory size, thus saving a great amount of time and memory space (and more particularly, the present invention can deal with "unknown" flash memories). The implementation details are as follows. One thing should be noted is that the related art technique must refer to the RDID to find the corresponding location of the flash memory in the look-up table, while this operation is not necessary in the present invention.

In the approach of the present invention, a magic string is written to an initial location of the memory space of a memory. After that, the memory size of the memory can be determined through finding the magic string, wherein the initial location may be Address 0. In the computer terminology, "magic string" generally means an input the programmer deems as non-external and capable of activating some hidden/unknown functions. When programing input commands, a user generally hopes these input commands have expected responses. However, if the user unintentionally make a predefined input to activate some internal functions, such kind of response could be far beyond the user's expectations, and is thus called as "magic". The above illustration focuses more on academic definitions, however. For better understanding, the term "magic string" can be realized as a specific string with the size modifiable by the user, but the string content should not be the same as that of other strings.

Initially, a magic string with unknown length may be written into the initial location of the flash memory, and the length of the first reading may be chose to be 64 Kbyte (KB). Assume the actual size of the SPI flash memory is 64 KB, bits $A_{15}$-$A_0$ are analyzable bits, and bits $A_{23}$-$A_{16}$ are invalid bits. When the read location is 64 KB (0×010000), since bits $A_{15}$-$A_0$ are all 0, the read SPI flash memory location is equivalent to 0×000000, and the location of the magic string determined in the first time reading presents the size of the SPI flash memory. In this case, only 16 bits with the 24 bits are actually used, and the rest 8 bits are equivalent to default bits. The above example discusses the scenario that the magic string is found during the first time reading. If the magic string is found during the first time reading, the length of the first time reading will be determined as the flash memory size.

Under the situation where the magic string is not found during the first time reading, the present approach will go on performing a second time reading on the memory with a second range, and so on, until the magic string is found. When the magic string is found during the N-th time reading, the N-th range used in the N-th time reading is determined as the block size of the memory, wherein N is a positive integer equal to or larger than 1. For example, the second time reading may adopt a double length (i.e. 128 KB). Likewise, the third range in the third time reading can be 256 KB. In other words, the reading length can be doubled in each time reading, that is, the reading range grows in the rate of power of 2. For example, if the magic string is not found when using $2^x$ reading range but is found when using $2^{x+1}$ reading range, the flash memory size is determined as 64 KB*$2^{x+1}$.

Please note that the above example is merely for illustrative purposes, and is not meant to be a limitation of the scope of the present invention. For example, the present invention is not limited to the above value, some values such as the initial reading range "64 KB" as well as the "24" bits reading command may be replaced with other values. In some embodiments, the increase of the reading range in the next iteration can also be the power of another number, rather than being in the manner of power of 2.

Figure 2:
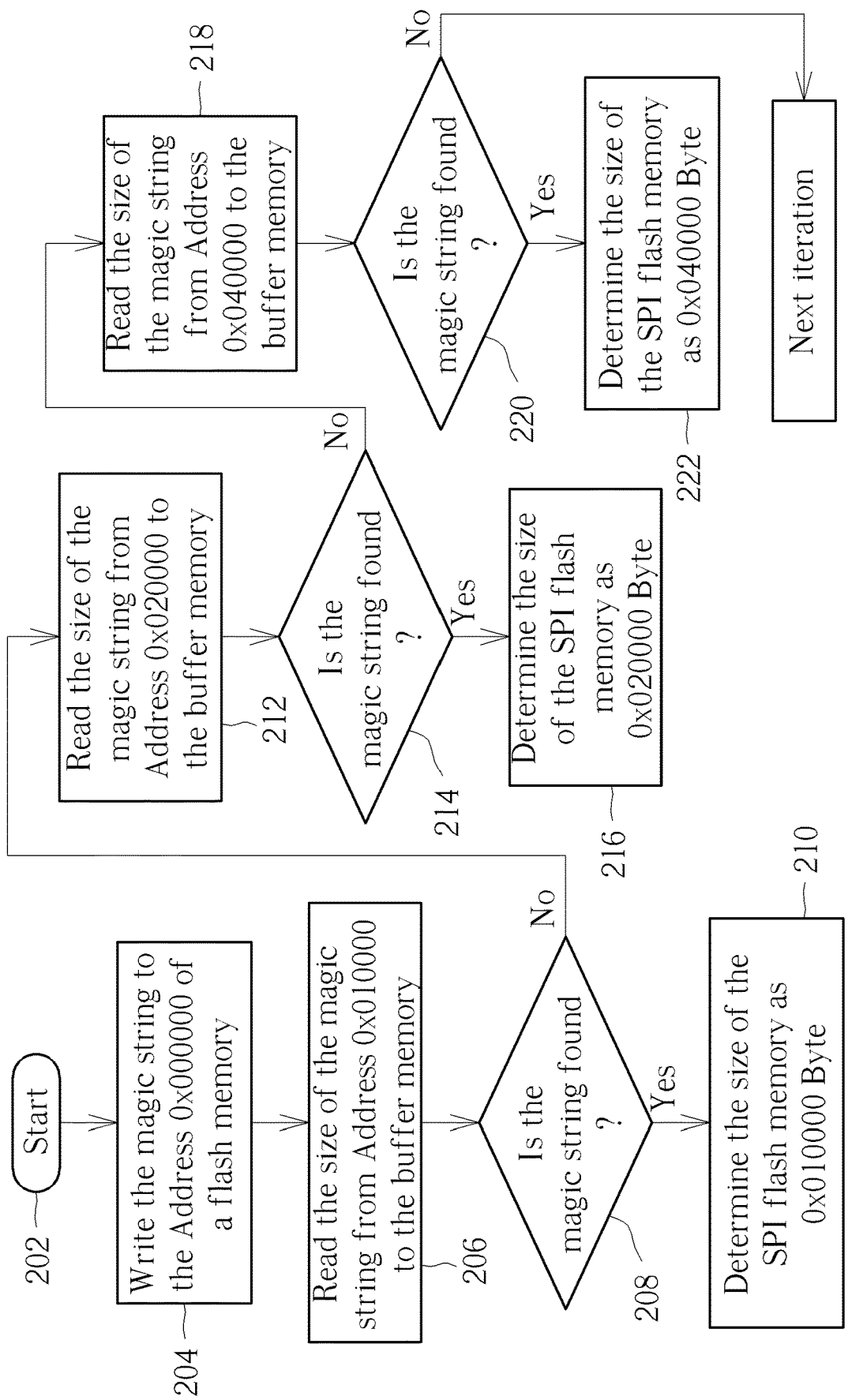
FIG. 2 a flowchart illustrating a memory block size determining method according to an embodiment of the present invention.

FIG. 2 a flowchart illustrating a memory block size determining method according to an embodiment of the present invention. As long as a substantially same result can be obtained, these steps are not necessary performed in the exact order shown in FIG. 2. In addition, this flow does not exclude the possibility of inserting one or more relevant steps. The steps shown in FIG. 2 may be combined with the above-described concepts of the present invention, and can be summarized as follows.

Step 202: Start.

Step 204: Write the magic string to the Address 0×000000 of a flash memory.

Step 206: Read the size of the magic string from Address 0×010000 to the buffer memory.

Step 208: Determine whether the magic string is found (if the presumed found magic string is identical to that in the buffer memory, it suggests that the magic string is found). If yes, the flow goes to Step 210; otherwise, the flow goes to Step 212.

Step 210: Determine the size of the SPI flash memory as 0×010000 Byte.

Step 212: Read the size of the magic string from Address 0×020000 to the buffer memory.

Step 214: Determine whether the magic string is found (if the presumed found magic string is identical to that in the buffer memory, it suggests that the magic string is found). If yes, the flow goes to Step 216; otherwise, the flow goes to Step 218.

Step 216: Determine the size of the SPI flash memory as 0×020000 Byte.

Step 218: Read the size of the magic string from Address 0×040000 to the buffer memory.

Step 220: Determine whether the magic string is found (if the presumed found magic string is identical to that in the buffer memory, it suggests that the magic string is found). If yes, the flow goes to Step 222; otherwise, proceed the next iteration.

Step 222: Determine the size of the SPI flash memory as 0×040000 Byte.

By utilizing the above method provided by the present invention, the block size of the memory can be obtained quickly and correctly. Further, the implementation of the embodiment of the present invention does not demand configuring additional hardware structure, and therefore the overall cost will not increase significantly. Compared with related art techniques, the present invention may improve the reading of memory devices without introducing a side effect, or in a way that less likely introduces a side effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory size determining method, comprising:
   writing a magic string into an initial location of the memory space of a memory;
   performing a first time reading with a first range on the memory, and if the magic string is not found in the first time reading, performing a second time reading with a second range on the memory, until the magic string is found; and
   if the magic string is found in an N-th time reading with an N-th range, determining the N-th range corresponding to the N-th time reading as the memory size, wherein N is a positive integer larger than or equal to 1.

2. The memory size determining method of claim 1, wherein the memory is a serial peripheral interface (SPI) flash memory.

3. The memory size determining method of claim 1, wherein the first range is 64 Kilo-bytes.

4. The memory size determining method of claim 1, wherein the second range is larger than the first range.

5. The memory size determining method of claim 4, wherein the second range is M times as lengthy as the first range, wherein M is a positive integer larger than or equal to 2.

6. The memory size determining method of claim 5, wherein the second range and the first range have a power of 2 relationship.

* * * * *